March 29, 1960  J. F. PASIEKA  2,930,863
ACCELERATION DETECTORS
Filed July 21, 1958  2 Sheets-Sheet 1
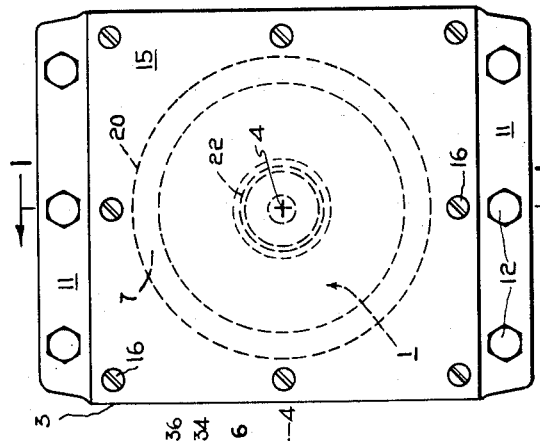
FIG. 2
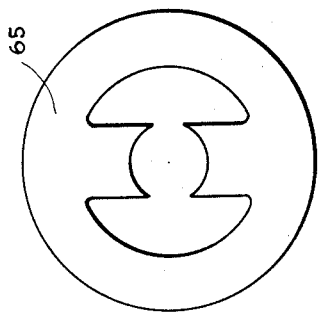
FIG. 6
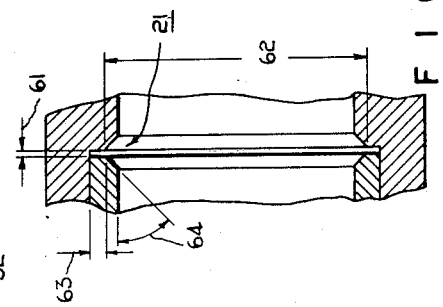
FIG. 5
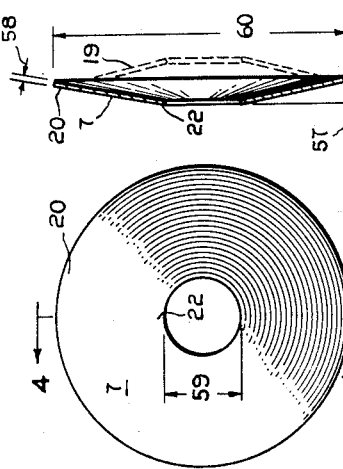
FIG. 4
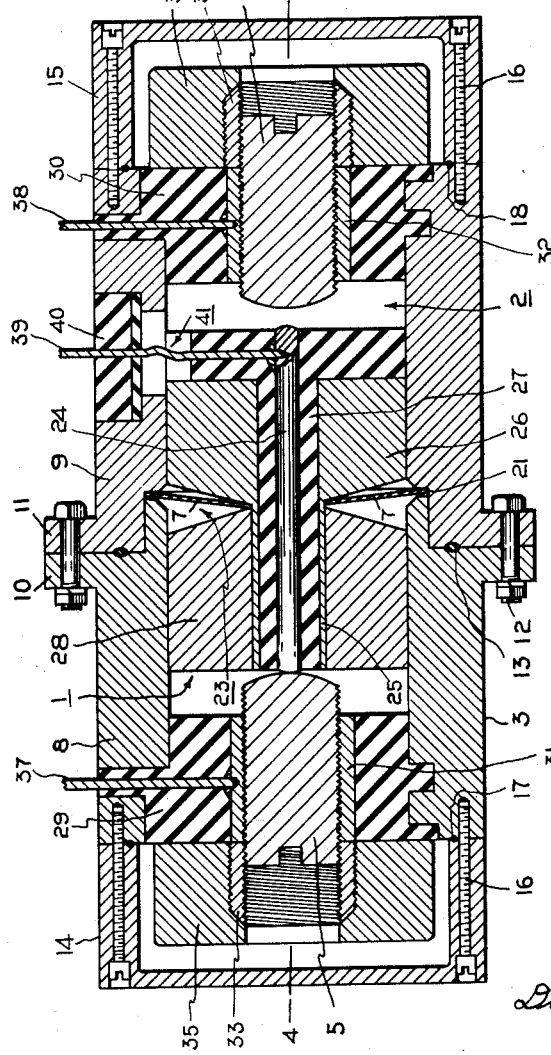
FIG. 1
FIG. 3
INVENTOR.
JOHN F. PASIEKA
BY
*Dike, Thompson & Bronstein*
ATTORNEYS March 29, 1960     J. F. PASIEKA     2,930,863
ACCELERATION DETECTORS Filed July 21, 1958     2 Sheets-Sheet 2

INVENTOR.
JOHN F. PASIEKA
BY
*Dike, Thompson & Bronstein*
ATTORNEYS

United States Patent Office 2,930,863
Patented Mar. 29, 1960

2,930,863

ACCELERATION DETECTORS

John F. Pasieka, South Acton, Mass., assignor of one-half to Raymond L. Renner, Cochituate, Mass.

Application July 21, 1958, Serial No. 750,028

15 Claims. (Cl. 200—61.53)

The present invention relates to acceleration-responsive apparatus and, in one particular aspect, to improved acceleration detectors of uncomplicated and low-cost construction operating with high precision and with positive and fast response to characterize accelerations experienced along a sensitive axis.

The importance of accurately characterizing both directional sense and magnitudes of accelerations is particularly well appreciated in the guidance and control fields, as where missiles or other craft are to be navigated, propelled, or otherwise experience actuations in accordance with the dictates of acceleration environments. Magnitude and direction of acceleration forces may be measured and correlated in detectors which involve response only along isolated axes, and a common form of detector of this type conveniently employs an inertia member or mass resiliently restrained against deflections along a support axis, the resulting direction and extent of longitudinal deflections along the support axis from a neutral position then affording information as to the direction and magnitude of components of acceleration in alignment with this axis. In satisfying high sensitivity requirements, the mass has been made relatively large, the resilient restraint minimized, and sliding friction of the mass within its supporting structure has been reduced through use of fluid-film bearings or avoided entirely through flat spring or diaphragm suspensions. A troublesome aspect of such designs involves highly undesirable responses to vibrations, which may have regenerative effects upon the spring-mass suspension and thereby cause wholly intolerable error. And, efforts to achieve extreme ruggedness, high sensitivity, and compensation for unwanted vibrational responses, tend to conflict with at least equally important needs for miniaturized bulk, simple and economical manufacture, and fast and positive operational responses.

According to the present invention, acceleration-responsive apparatus of the movable-mass type uniquely employs at least one special form of annular spring washer which tends to relieve certain internal stresses developed within it as it is forced to a substantially flat unstable condition by next axially projecting itself into a frusto-conical stable configuration in one or the opposite direction. A preferred form of washer has itself been long known and has been used in other ways. It is also well known that other springs and combinations of springs may be employed to obtain certain types of snap-action characteristics, as in the electrical circuit breaker or switch arts, although not involving the novel and distinctive assemblies and operational features here disclosed. For sensitivity to acceleration in two axial directions, the washer cooperates with two adjustable stop arrangements which serve to pre-stress it toward the flattened unstable condition, which in the case of a preferred washer construction has a highly advantageous sharp cross-over characteristic. The associated seismic mass then functions to add only such additional axial forces as are required to displace the washer beyond its cross-over position, whereupon extremely large washer thrust forces may be exerted to drive the mass to a critical orientation which signifies occurrence of predetermined accelerations in a given direction and which readies the device for sensitive response to predetermined acceleration of opposite direction. The seismic mass may thus be caused to perform a triggering function, and, significantly, may itself be of unexpectedly small size and weight even though the thrust forces it occasions are disproportionately large. This action is realizable with washers which are themselves minute and which advantageously require no accessory springs or complicated or delicate mounts. Substantial immunity to the commonly deleterious effects of vibration is achieved through the biasing action of the washer in frictionally urging the seismic mass against the associated mechanical stops to occasion self-damping tendencies, and the functions of adjustable stops and electrical contacts may be usefully combined with the desirable result that uncertain or variable contacting is wholly eliminated. Through reliance upon large washer forces for actuations, unusually fast responses are obtained, and a cardinal weakness of other accelerometers is thus overcome. Sliding friction of the mass may also be rendered of little consequence because of the large thrust forces which are triggered into actuation.

It is one of the objects of the present invention, therefore, to provide novel and improved accelerometer apparatus of uncomplicated and low-cost construction which responds with very high speed and certainty to accelerations along a sensing axis.

A further object is to provide improved sensitive detectors of acceleration wherein a movable seismic member of relatively small size and mass nevertheless occasions fast and high-thrust signalling movements characterizing sensed accelerations.

Another object is to provide improved precision accelerometers employing critically-biased spring washers having sharp cross-over deflection characteristics and which are readily adjustable for accurate response to selected and different accelerations over a particularly wide range.

Still further, it is an object to provide sensitive instantaneously-responsive accelerometers of economical manufacture and simplified mechanical construction which are self-damped against erroneous response to vibration and in which sliding friction is relatively non-critical.

By way of a summary account of practice of this invention in one of its aspects, a generally cylindrical seismic mass member is disposed for longitudinal sliding movement along a sensing axis within an accommodating bore in a casing. Fitted within the casing is an annular spring washer of slightly frustro-conical shape and having a ratio of axial height to material thickness which causes the washer to possess two axial equilibrium positions. The outer periphery of the washer is recessed into a specially shaped annular groove which extends radially outward from the inner surface of the casing bore, and the inner periphery of the washer fits within a second specially shaped annular groove projecting radially into the cylindrical mass, whereby the movable mass tends to be axially displaced toward one or the other side of the substantially fixed outer periphery of the spring washer. At each axial end of the casing, and projecting axially inward toward the mass, there is mounted an insulated axially adjustable stop and electrical contact member, the inner end of which is shaped for engagement and electriacl contact with an end of the movable mass. Each of the stop members is axially adjusted to permit the mass to become displaced in its direction past the cross-over position of the washer but to prevent it from moving the full axial distance which the washer tends to thrust it. Moreover, the axial adjustment of each stop is carefully set such that the superimposed force on the washer in the same direction as that exerted by the stop which will cause the washer to pass its cross-over position in that direction will equal the product of the mass of the seismic member and a predetermined acceleration along the sensing axis. Each departure of the mass from a position of firm engagement with one stop to rapid engagement with the other then represents occurrence of a predetermined acceleration in a given direction, and the electrical contacting between the mass and stops translates such occurrences into characterizing electrical circuit conditions.

Although the features of this invention which are believed to be novel are set forth in the appended claims, further details of the invention itself and additional objects and advantages thereof may be readily comprehended through reference to the following description taken in connection with the accompanying drawings, wherein:

Figure 1 is a longitudinal cross-sectioned view of a preferred embodiment of miniature accelerometer incorporating teachings of this invention;

Figure 2 portrays the same apparatus in an end view;

Figure 3 is a front pictorial representation of a preferred form of spring washer such as that in the apparatus of the preceding figures;

Figure 4 presents a transverse cross-section taken along section line 4—4 in Figure 3;

Figure 5 is a cross-sectioned fragment of the Figure 1 accelerometer illustrating details of the shaped recess for the outer periphery of the spring washer, the latter being removed;

Figure 6 pictorially illustrates a modified spring washer construction;

Figure 7 provides a graphical representation of typical force and deflection characteristics for improved accelerometers of this invention;

Figure 7:
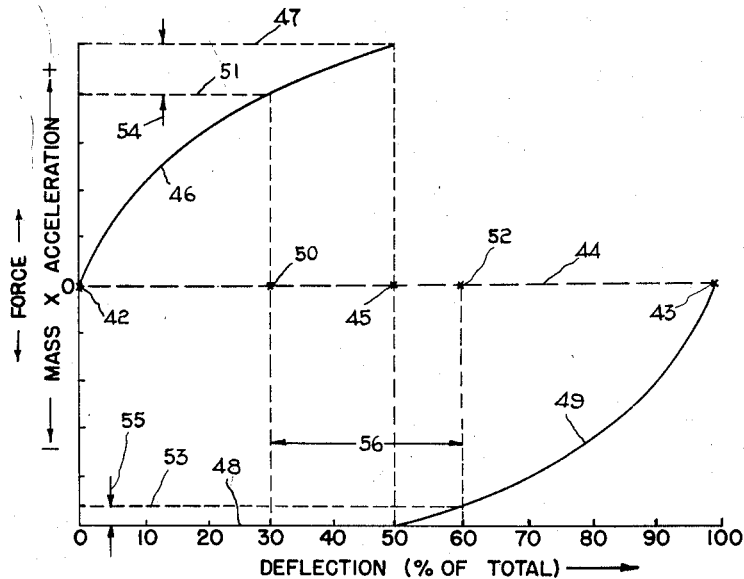

Having reference to the Figure 1 representation of a preferred accelerometer construction, it is noted that a seismic mass assembly 1 of cylindrical outline is disposed within an accommodating central bore 2 of an elongated outer casing 3 which is square in transverse cross-sectional outline. Freedom of mass assembly 1 for longitudinal sliding movement along a sensing axis 4—4 is limited by the axially separated stop and contact members 5 and 6 and is restrained by a spring washer element 7 having a pre-loading or biasing detailed later herein. For purposes of convenient assembly of components, casing 3 is comprised of two mating sections 8 and 9 having flanges 10 and 11 through which the sections may be fixed together rigidly by fastening bolts 12, with a deformable ring seal 13 compressed between them. Ends of the structure are shut by covers 14 and 15 which are affixed to the casing sections by bolts 16 and sealed by rings 17 and 18, whereby the assembly is mechanically rigid and has internal components isolated against contaminants, corrosives, and disturbance of adjustments.

Annular spring washer 7 is of a slightly frusto-conical configuration, as may be readily perceived from the relationships between the front and cross-sectioned side views of Figures 3 and 4, and it may be caused to have the desired spring characteristics through known pre-forming and treating practices. For the moment, it suffices to note that these desired characteristics involve natural tendencies of the washer to force itself to either of the stable positions shown in solid lines and in the dashed-line representation 19 in Figure 4. Because the outer periphery of washer edge 20 is relatively fixed in position by its confinement to within annular casing recess 21, best shown in Figure 5, the inner peripheral edge 22 performs excursions from one to the other side of the outer edge under actuated conditions. These excursions result from effects of certain accelerations upon the movable mass 1 to which the inner edge of washer 7 is fixed by being set within its deep annular groove 23. Assembly is facilitated by the multiple-part fabrication of mass member 1, the central longitudinal contact rod 24 thereof being mounted within the sleeve portion 25 and more massive integral end portion 26 by electrically insulating material 27, and the remaining weight portion 28 being firmly pressed or shrunk upon the shaft portion 25 after the washer 7 has first been set in place. Washer 7 is held against excessive lateral displacement in relation to mass 1 at its inner peripheral edge, and the walls of mass portions 26 and 28 which confront one another across recess 23 are slanted axially away from each other as the radial distance from axis 4—4 increases, whereby the washer excursions of the aforementioned type are permitted to occur without interference from these walls. In radial cross-section, each part of the recess 23 of the Figure 1 apparatus is triangularly shaped, with the inner edge of the washer held only near the apex.

The fit of cylindrical mass assembly 1 within casing 3 permits relative sliding movements, preferably with relatively low levels of friction, such that the movable central electrical contact may be actuated between positions at which it electrically connects with one or the other of the fixed end contacts and stops 5 and 6. The latter contacts are mounted one near each axial end of the casing, in insulating radial supports 29 and 30, and are externally threaded for axial adjustability within the internally-threaded conductive sleeves 31 and 32, respectively, fixed in position by the insulating supports. Split locking sleeves 33 and 34 and tapered lock nuts 35 and 36 preserve important axial settings which have been made by manipulations of a tool fitted into the shaped outer ends of the contacts for this purpose. Isolated connection of contacts 5 and 6 with external circuitry of known types is by way of leads 37 and 38 joined to the sleeves 31 and 32 and insulated by their molding within supports 29 and 30, while movable contact 24 is coupled with a flexible lead 39 molded in part within the insulating material 27 of the mass assembly and also preferably electrically isolated from the casing by lead-through insulation 40. Casing 3 may then conveniently be grounded and yet remain insulated from the single-pole double-throw switching structure. Both casing 3 and mass assembly 1 are shown to be cut away in the vicinity of a somewhat slackened or crimped portion 41 of lead 39 to permit ready flexure of this portion and relative axial displacement between the casing and mass assembly. In practice, lead 39 may conveniently comprise a solid single wire strand, inasmuch as only small relative travel may occur between the casing and mass assembly, although more flexibility is obtainable with a braided lead.

Alternatively, a sliding electrical connection may be employed for the electrical coupling while permitting relative movement of the parts coupled. Electrical contact and conducting areas of stops 5 and 6 and of movable contact 24 are broad and structurally rugged, whereby they afford large current-carrying capacity and resist damage from effects of shock or other transient accelerations. By way of distinction, other accelerometers may be limited to use with relatively small and delicate contacts.

Responses of the Figure 1 apparatus are to accelerations or components of acceleration in the two directions along sensitive axis 4—4. The type of spring employed would normally offer a relatively high resistance to axial displacement, such that it could be thrust inside out, and thereby close electrical contacts, only by relatively large acceleration forces acting upon a relatively large mass built into assembly 1. And, the required actuating force in both axial directions would be substantially the same, such that the response would be to the same level of acceleration in both directions. However, the spring washer 7 in this apparatus is not permitted to distend itself fully toward one or the other of its stable equilibrium positions, and is, instead, pre-loaded or stressed by one of the stops 5 and 6. As viewed in Figure 1, for example, the position of washer 7 does not represent a condition of least internal stress in the washer, but, rather, a condition in which the washer continuously urges the mass assembly toward the left against contact and stop 5, in an effort to approach the condition of least stress. The magnitudes of such continuous forces are regulated by axial adjustment of stops 5 and 6 and are important for three principal reasons: first, that the frictional engagements between the stops and mass assembly provide self-damping against undesired resonant vibration of the mass assembly, such as may occur in apparatus when the mass is suspended by springs alone; second, that the permissible axial travel of the mass assembly is shortened, thereby also providing shortened response times; and third, that the additional forces needed to cause responses to accelerations may be low, may be adjustable with high precision, and may be different for the two directions of response.

In the latter connection, especially, the graphical display of Figure 7 is noteworthy. The abscissa is there divided in terms of percentage spring washer deflection, the total deflection being that of the inner peripheral edge, in the case of a relatively fixed mounting of the outer peripheral edge. With reference to Figure 4, for example, the full deflection of washer 7 is that between the solid-line and dashed-line orientations. When it assumes either of these stable orientations, the washer exerts no axial thrust forces along the central axis 4—4, as is characterized by the zero level forces at the 0 and 100% deflection positions 42 and 43. Flattening of the washer can take place only through application of relatively large forces to it in the axial direction, and these applied forces, as well as the thrust forces with which the washer resists axial displacement, are plotted along the ordinate in the two directions of different sign from the zero level 44. The substantially flattened condition, represented as occurring in the vicinity of the 50% deflection position 45, is an unstable one, in that the washer tends to thrust itself from this condition to one of the stable conditions which exist when it is in either of positions 42 or 43.

If the curve portion 46 is taken to represent the force vs. deflection characteristic of an unbiased washer such as washer 7 in Figure 1 as it is moved to the right from a left stable position 42, a particularly large total positive force of the level 47 is found to be required to press the washer past the central unstable position 45. This force corresponds to the mass of mass assembly 1 multiplied by a predetermined value of acceleration which would be required to accomplish the same result. In general, it may be stated that either a large acceleration or a large mass, or both, would be necessary in a unit such as that under discussion. Once the central unstable cross-over position has been passed, the washer itself then exerts the full level 48 of negative forces in the opposite axial direction, and tends to thrust itself toward the opposite stable position 43 with a force vs. deflection characteristic represented by curve portion 49. The latter action of course occurs even though the original acceleration to the right no longer persists, and it tends to occur with great speed because of the magnitude of thrust forces involved. Leftward movement, from position 43 toward position 42, is of like character and marked by comparable occurrences and is responsive to leftward accelerations along axis 4—4.

However, the lefthand stop and contact element 5 is axially adjusted such that washer 7 can rest only at a position, such as 50, which is disposed to the right of the zero-level stable position 42 and at which the stop element exerts a restraining or biasing force of the relatively high level 51. Righthand stop element 6 is similarly adjusted, toward the left, such that washer 7 is biased to position 52 when deflected to the right of the cross-over position 45. This stop exerts a force of the level 53 against the washer. Accordingly, it will be perceived that for deflection of the pre-stressed washer 7 from a lefthand position, past the cross-over position, and to the right, only a relatively small force of the value 54 is required in an axial direction to the right along sensing axis 4—4. This additional force may be realized with a more moderate mass of assembly 1 and with a more moderate level of acceleration acting upon this mass than would be the case if the washer were not carefully biased to near the cross-over condition. Size and bulk of the mass assembly may thus be preserved small. Once the cross-over position has been exceeded as the result of travel of the mass assembly, the washer then forcefully and rapidly thrusts the mass into contact with the opposite stop and contact element 6. From the latter stopped position, the mass may then be forced back into contact with stop element 5 by leftward accelerations accounting for the even smaller additional force of differential value 55. Total washer deflection is of percentage deflection value 56 which in the illustrated case is only 30% of the total possible deflection of a comparable unbiased washer. Through axial adjustments of stops 5 and 6, the washer may be forced to within minute proximity to its cross-over position, such that minute accelerations will cause actuations. Alternatively, the actuating accelerations may be set to large values; and it becomes possible to have low and large acceleration responses in the two different directions in the same instrument, through simple adjustments. Factory adjustments are readily made to produce exactly the same responses in different instruments. A large variety of responses are obviously obtainable with one accelerometer design, and the yield of one production line can be calibrated to perform sensitive and accurate measurements over vastly different ranges of acceleration.

The gap which separates electrical contact rod 24 and either of the relatively stationary contacts 5 and 6 is relatively small, with the highly advantageous result that travel and response times are correspondingly small. And, despite the narrowness of the contacting gap, erroneous actuations are avoided due to the tendencies of the mass assembly to remain in one or the other contacting position under restraint of the washer forces. The contacting forces also preserve positive electrical coupling and suppress chatter or intermittent contacting. Perhaps even more significantly, however, these continuously-exerted forces tend to reduce unwanted vibration of the mass assembly by physically connecting the stops and mass assembly at all times when the contact excursions are not undergone. As a consequence, tendencies of the mass assembly to resonate under influence of vibration are suppressed, and a major drawback of other accelerometers is overcome very simply.

In the preferred construction depicted in Figures 3 and 4, annular spring washer 7 possesses a ratio of height, 57, to thickness, 58, which is greater than 2.83, which ratio is known to yield a spring characteristic of the type displayed in Figure 7. Absolute values of the loads forcing such a washer to its cross-over condition will depend upon a number of factors, including the material, the thickness 58 and the inner and outer diameters 59 and 60. One satisfactory steel spring element has a thickness of about 0.005 inch, and inner and outer diameters of 0.312 and 0.750 inch, respectively. Complementary dimensions of the casing recess shown in Figure 5 include a thickness 61 of about 0.006 inch, an intermediate diameter 62 of about 0.730–0.740 inch, an annular slot thickness 63 of about 0.005–0.010 inch, and an outer wall taper 64 of about 45 degrees. It will be clear that, with these dimensions, the outer peripheral edge of the washer is free to shift position within the annular recess as it passes through its cross-over condition, rather than being held rigidly. The same is true in connection with the seating of its inner peripheral edge within the recess in the mass assembly 1. This should not be taken to imply that the spring position may so vary that the deflection characteristics and responses may alter, however. Referring to the Figure 1 illustration, for example, it will be observed that the right side of the outer peripheral edge rests in accurate alignment against the right side of the annular recess, as it does each time the washer is distended to the left, and that the left side of the inner peripheral edge rests at a predetermined position against the left side of the recess 23 in the mass assembly. The biased spring forces insure that there is no end play and that these positions will repeat themselves precisely each time the washer is so distended. Positions shift in opposite sense when the washer thrusts itself to the right of its cross-over position, but these positions are likewise repeatable, and, accordingly, the deflection characteristics are fixed in both directions. The slightly oversize dimensions of recesses in the casing and mass assembly are of course provided such that the reversals in configuration of the spring washer may be accommodated without restraining the washer and altering its deflection characteristics. A central opening in the washer itself is found to influence the deflection characteristic favorably, and the annular frusto-conical configuration is preferred. However, this configuration may be altered somewhat with useful results, as in the case of washer 65 in Figure 6. The cross section of this washer is also like that of Figure 4, although portions of the spring have been cut away. Spring plastics, as well as spring metals, are suitable washer fabrication materials.

Figure 8:
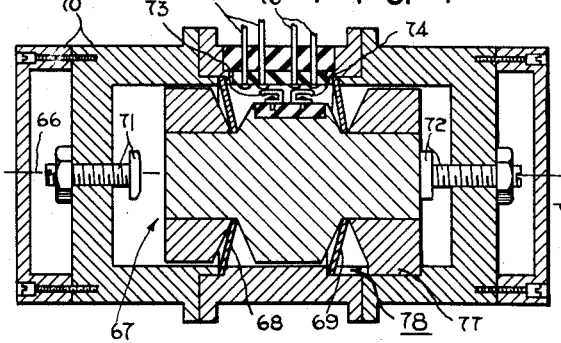
Figure 8 is a longitudinal cross-sectioned view of an accelerometer having a dual spring suspension for a seismic mass as well as sliding contact provisions independent of the adjustable pre-loading stops.
Figure 9:
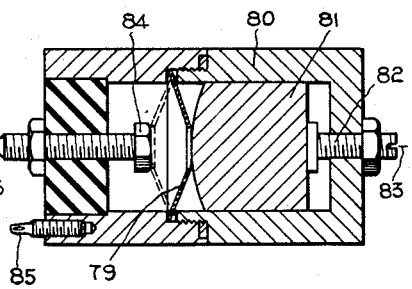
Figure 9 illustrates in longitudinal cross-section another form of accelerometer having high unidirectional response.

The embodiment depicted in Figure 8 involves generally similar acceleration responses along a sensitive axis 66—66 as a mass assembly 67 is displaced by acceleration forces. In this instance, however, the composite mass assembly 67 is suspended by a pair of spring washers, 68 and 69, which are axially spaced within the casing 70. Washer mountings within recesses in the casing and mass assembly are akin to that earlier discussed in connection with the Figure 1 apparatus, and the washers are arranged to be distended in the same direction at the same time. Deflection characteristics of the two washers combine, with the result that two small washers may produce large restraining forces. A principal advantage, for some applications, is found in the fact that the two washers may constitute the sole support for the mass assembly. In a yet further alternative, one of springs 68 and 69 could be of a conventional diaphragm or spider construction which aids in support of the mass assembly but does not contribute to the desired force vs. deflection characteristic. Axially adjustable limit stops 71 and 72 are not shown to provide an electrical contacting which, instead, is performed by the two insulated shorting bars 73 and 74 mounted on the movable mass assembly and cooperating with the insulated contacts 75 fixed with lead pairs 75 and 76, respectively, on casing 70. The contacting elements are conveniently preserved in angular alignment about axis 66—66 by a keyed portion 77 of the mass assembly which slides in a casing guide slot 78. The illustrated orientation of parts is one wherein circuitry associated with leads 77 is closed through resilient shorting bar 74, although this circuit becomes opened and that associated with leads 75 becomes closed through bar or pole 73 when a predetermined acceleration to the left is experienced. Large washer thrust forces which are brought into play upon actuation by predetermined accelerations are ample enough to close the electrical connections firmly even though the frictional engagement forces at the contacts are large.

Where only a single acceleration response is required, and where the response must be as rapid as possible, the Figure 9 construction may be employed. Washer 79 there is mounted in an annular recess in the casing 80 at its outer peripheral edge but floats free of the slidable mass 81 at its inner periphery. Adjustable end stop 82 urges mass 81 leftward against washer 79, thereby prestressing or biasing it to the desired extent, and only a predetermined relatively small acceleration to the left along sensing axis 83—83 suffices to trigger the washer past its cross-over position to the lefthand dashed-line orientation at which it engages adjustable insulated contact 84. In this travel, the washer carries only its own weight and may in fact lead the travel of the mass 81 following it to the left, whereby the response is virtually instantaneous. This response is likewise positive and results in firm electrical coupling of the washer with contact 84. The latter is preferably positioned just to the left of the washer cross-over position, to minimize the gap which must be traversed and thus to minimize the response time, although the relationships are exaggerated in the drawing for purposes of clarity. Washer 79 in this instance is part of the electrical circuit between the casing contact 85 and contact 84 and is therefore of electrically conductive material.

Figure 10:
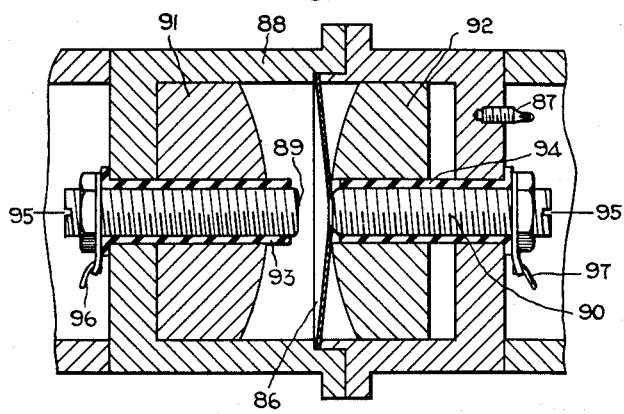
Figure 10 depicts a unique high-response-speed accelerometer having sensitivities in two axial directions.

Acceleration responses in two axial directions are obtainable with heightened speed in a construction portrayed in Figure 10. A conductive washer 86 there couples the electrical connector 87 of casing 88 with either of the insulated adjustable limit stops and contacts 89 and 90 in a single-pole double-throw electrical switching action responsive to the influences of two slidable annular masses 91 and 92. Insulating sleeves 93 and 94 electrically isolate the contacts 89 and 90 from the mass and casing except through the contacting washer 86, and these contacts mechanically bias the washer in two directions along sensing axis 95—95 for purposes already discussed. Upon occurrence of at least a predetermined acceleration to the left, annular mass 91 is urged to the left out of any possible obstructing relationship to the end of contact 89, and mass 92 is likewise urged to the left against washer 86, the latter action serving to trigger the washer past its cross-over position. Thereupon, the washer instantly contacts the end of contact 89 to close the circuit through connectors 87 and 96. In this action, the rapid travel of the washer is unimpeded by the actuating mass 92. Thereafter, a predetermined acceleration to the right results in closure of the circuit between connectors 87 and 97, in like manner.

In the various constructions, the limit stops and the surfaces of the mass assembly which engage the stops are preferably of hard material which resists deformation under the impacts which take place in response to the washer thrust forces. Accurate repeatability is thus assured, in that the energy storage in the spring washer will not be permitted to vary. Flexible contacts may be employed in conjunction with inflexible stops, as in the Figure 8 embodiment, to realize the same advantage. Contact surfaces are preferably plated with relatively non-corroding conductive material such as silver or gold, and the apparatus may be filled with dry inert gas to afford further protection of components. A bore or perforation through the washer or mass assembly may assist in equalizing pressures on both sides of the mass assembly and in preventing undue damping, if leakages about the peripheries of the washer and mass assembly are not in themselves sufficient for this purpose. Fluid filling for additional damping may be practiced in a known manner. It should also be apparent that the mass assembly may assume shapes other than cylindrical, and that known electrical transducers, pickoffs, and the like may replace the illustrated electrical contacts for some applications.

Accordingly, it should be understood that the specific embodiments of this invention disclosed herein are of a descriptive rather than a limiting nature and that various changes, combinations, substitutions or modifications may be introduced in accordance with these teachings without departing in spirit or scope from this invention in its broader aspects.

What I claim as new and desire to secure by Letters Patent of the United States is:

1. Acceleration-responsive apparatus comprising a support, a mass movable in relation to said support along a sensing axis responsive to acceleration, at least one shaped spring member having the form of sheet material and having outer peripheral portions mounted on said support and an inner portion deflectable along said axis between two orientations of stable equilibrium on either side of said peripheral portions, said spring member being dimensioned to develop thrust forces between said inner and outer portions along said axis in one and the opposite direction toward said equilibrium orientations upon deflection of said inner portion through an unstable cross-over position in which said inner and outer portions are substantially coplanar, said mass being positioned on said support to deflect said inner portion of said spring member toward and through said cross-over position responsive to acceleration along said axis, first adjustable stop means mounted on said support and adjusted to limit axial deflection of said inner portion of said spring member to a first biased position intermediate said cross-over position and one of said stable equilibrium orientations, second adjustable stop means mounted on said support and adjusted to limit axial deflection of said inner portion of said spring member to a second biased position intermediate said cross-over position and the other of said stable equilibrium orientations, whereby a first predetermined acceleration force acting on said mass in one direction along said axis acts to deflect said inner portion of said spring member from said first biased position through said cross-over position and a second predetermined acceleration force in the opposite direction acts to deflect said inner portion from said second biased position through said cross-over position, and electric circuit means characterizing axial movements of said inner portion of said spring member in response to occurrence of said predetermined accelerations.

2. Acceleration-responsive apparatus comprising a support, a mass movable in relation to said support along a sensing axis responsive to acceleration, at least one shaped spring member having the form of sheet material and having outer peripheral portions mounted on said support and an inner portion deflectable along said axis between two orientations of stable equilibrium on either side of said peripheral portions, said spring member being dimensioned to develop thrust forces between said inner and outer portions along said axis in one and the opposite direction toward said equilibrium orientations upon deflection of said inner portion through an unstable cross-over position in which said inner and outer portions are substantially coplanar, said mass being positioned on said support to deflect said inner portion of said spring member toward and through said cross-over position responsive to acceleration along said axis, first and second adjustable stops mounted on said support and adjusted to stop axial deflection of said inner portion of said spring member at first and second stop positions, respectively, each intermediate said cross-over position and a different one of said stable equilibrium orientations, at least one of said stops comprising an electrically conductive contact, and means for electrically connecting with said stop contact responsive to stopping of said inner portion of said spring member by said contact, whereby predetermined acceleration force acting on said mass in one direction along said axis acts to deflect said inner portion of said spring member from one of said stop positions through said cross-over position toward said contact and to electrically connect said connecting means and contact.

3. Acceleration-responsive apparatus as set forth in claim 2 wherein said first and second stops comprise electrically conductive contacts disposed for electrical connection with said connecting means responsive to stopping by said contacts, and means for electrically insulating said contacts from one another and from said connecting means, whereby predetermined acceleration forces in opposite directions along said axis act to deflect said inner portion of said spring member from a different one of said stop positions through said cross-over position toward a different one of said contacts.

4. Acceleration-responsive apparatus comprising a support, a mass movable in relation to said support along a sensing axis responsive to acceleration, at least one shaped spring member having the form of sheet material and having outer peripheral portions mounted on said support and an inner portion fixed with said mass and deflectable therewith along said axis between two orientations of stable equilibrium on either side of said peripheral portions, said spring member being dimensioned to develop thrust forces between said inner and outer portions along said axis in one and the opposite direction toward said equilibrium orientations upon deflection of said inner portion through an unstable cross-over position in which said inner and outer portions are substantially coplanar, adjustable stop means mounted on said support and adjusted to frictionally engage said mass and force said mass against said inner portion of said spring member to a biased position at which said inner portion is disposed intermediate said cross-over position and one of said stable equilibrium orientations, whereby frictional engagement of said mass and stop means suppresses tendencies of said mass to vibrate and whereby a predetermined acceleration force acting on said mass in one direction along said axis deflects said mass from said biased position and deflects said inner portion of said spring member through said cross-over position, and electric circuit means characterizing axial movement of said mass and said inner portion of said spring member in response to occurrence of said predetermined acceleration.

5. Acceleration-responsive apparatus comprising a support, a mass assembly movable in relation to said support along a sensing axis responsive to acceleration, at least one shaped spring member having the form of sheet material and having outer peripheral portions mounted on said support and an inner portion fixed with said mass assembly and deflectable therewith along said axis between two orientations of stable equilibrium on either side of said peripheral portions, said spring member being dimensioned to develop thrust forces between said inner and outer portions along said axis in one and the opposite direction toward said equilibrium orientations upon deflection of said inner portion through an unstable cross-over position in which said inner and outer positions are substantially coplanar, first and second adjustable stop means mounted on said support and each adjusted along said axis in position to frictionally engage said mass assembly and force said mass assembly against said inner portion of said spring member to first and second biased positions, respectively, at which said inner portion is disposed intermediate said cross-over position and a different one of said stable equilibrium orientations, whereby frictional engagement of said mass assembly and one of said stop means at any time suppresses tendencies of said mass assembly to vibrate and whereby a predetermined acceleration force acting on said mass assembly in one direction along said axis deflects said mass assembly from one of said biased positions and deflects said inner portion of said spring member through said cross-over position, said first and second stop means each having an electrically conductive contacting surface disposed for said frictional engagement with said mass assembly, said movable mass assembly including electrically conductive contacting surfaces disposed for said frictional engagement with said contacting surfaces of said stop means, means for electrically insulating said contacting surfaces of said stop means from each other and from said contacting surfaces of said mass assembly, and means providing electrical circuit connections with said contacting surfaces.

6. Acceleration-responsive apparatus comprising a support, a mass movable in relation to said support along a sensing axis responsive to acceleration, at least one shaped spring member mounted on said support and having the form of sheet material and having outer peripheral portions and an inner portion, said inner and outer portions being deflectable in relation to one another along said axis between two orientations of stable equilibrium in which said inner portion is disposed on opposite sides of said peripheral portions, said spring member being dimensioned to develop thrust forces between said inner and outer portions along said axis in one and the opposite direction toward said equilibrium orientations upon relative deflection of said inner and outer portions through an unstable cross-over position in which said inner and outer portions are substantially coplanar, means mounting one of said inner and outer portions of said spring member in substantially fixed relationship to said support, said mass being positioned on said support to deflect the other of said inner and outer portions of said spring member toward and through said cross-over position responsive to acceleration along said axis, adjustable stop means mounted on said support and adjusted to limit axial deflection of said other portion of said spring member to a biased position intermediate said cross-over position and one of said stable equilibrium orientations, whereby a predetermined acceleration force acting on said mass in one direction along said axis deflects said other portion of said spring member from said biased position through said cross-over position, and electric circuit means characterizing axial movement of said other portion of said spring member in response to occurrence of said predetermined acceleration.

7. Acceleration-responsive apparatus comprising a support, a mass movable in relation to said support along a sensing axis responsive to acceleration, at least one spring-washer member of a normally substantially frustroconical configuration mounted on said support and having inner and outer peripheral portions deflectable in relation to one another along said axis between two positions of stable equilibrium in which said inner portion is disposed on opposite sides of said outer portion, said spring-washer member having a normal height of said frusto-conical configuration which is at least in a ratio to the substantially uniform thickness thereof which produces a tendency for said portions to assume said equilibrium positions, means mounting one of said inner and outer portions of said spring-washer member on said support in a substantially fixed relationship along said axis, said mass being positioned on said support to deflect the other of said portions of said member and to flatten said member responsive to acceleration along said axis, adjustable stop means mounted on said support and adjusted to limit axial deflection of said other portion of said member to a biased position intermediate one of said stable equilibrium positions and an unstable position in which said member is flattened, whereby a predetermined acceleration force acting on said mass in one direction along said axis deflects said other portion from said biased position through said unstable position, and electric circuit means characterizing axial movement of said other portion of said member in response to occurrence of said predetermined acceleration.

8. Acceleration-responsive apparatus comprising a support, a mass movable in relation to said support along a sensing axis responsive to acceleration, at least one spring-washer member of a normally substantially frustroconical configuration mounted on said support and having inner and outer peripheral portions deflectable in relation to one another along said axis between two positions of stable equilibrium in which said inner portion is disposed on opposite sides of said outer portion, said spring-washer member having a normal height of said frustro-conical configuration which is at least in a ratio to the substantially uniform thickness thereof which produces a tendency for said portions to assume said equilibrium positions, means mounting said outer peripheral portion of said spring-washer member on said support in a substantially fixed relationship along said axis, said mass being positioned on said support in substantially fixed relationship to said inner peripheral portion of said member to deflect said inner portion and to flatten said member responsive to acceleration along said axis, adjustable stop means mounted on said support and adjusted to frictionally engage said mass and force said mass against said inner portion to a biased position at which said inner portion is disposed intermediate one of said stable equilibrium positions and an unstable position in which said member is flattened, whereby frictional engagement of said mass and stop means suppresses tendencies of said mass to vibrate and whereby a predetermined acceleration force acting on said mass in one direction along said axis deflects said mass from said biased position and deflects said inner portion of said spring-washer member through said unstable position, and electric circuit means characterizing axial movement of said mass and said inner portion of said spring-washer member in response to occurrence of said predetermined acceleration.

9. Acceleration-responsive apparatus comprising a support, a mass assembly movable in relation to said support along a sensing axis responsive to acceleration, at least one spring-washer member of a normally substantially frusto-conical configuration mounted on said support and having inner and outer peripheral portions deflectable in relation to one another along said axis between two positions of stable equilibrium in which said inner portion is disposed on opposite sides of said outer portion, said spring-washer member having a normal height of said frusto-conical configuration which is at least in the ratio of 2.83 to the substantially uniform thickness thereof, means mounting said outer peripheral portion of said spring-washer member on said support in a substantially fixed relationship along said axis, said mass being positioned on said support in substantially fixed relationship to said inner portion of said spring-washer member to deflect said inner portion and to flatten said member responsive to acceleration along said axis, first and second adjustable stop means mounted on said support and each adjusted along said axis in position to frictionally engage said mass assembly and force said mass assembly against said inner portion of said spring-washer member to first and second biased positions, respectively, at which said inner portion is disposed intermediate a different one of said stable equilbirium positions and an unstable position in which said member is flattened, whereby frictional engagement of said mass assembly and one of said stop means at any time suppresses tendencies of said mass assembly to vibrate and whereby a predetermined acceleration force acting on said mass assembly in a direction along said axis deflects said mass assembly from one of said biased positions and deflects said inner portion of said spring-waher member through said unstable position, and electric circuit means characterizing axial movement of said mass assembly in response to occurrence of said predetermined acceleration.

10. Acceleration-responsive apparatus as set forth in claim 9 wherein said electric circuit means comprises an electrically conductive contacting surface on at least one of said first and second stop means disposed for said frictional engagement with said mass assembly, at least one electrically conductive contacting surface carried by said mass assembly and disposed for said frictional engagement with said contacting surface of said stop means, means electrically insulating said contacting surfaces from one another, and means providing electrical circuit connections with said contacting surfaces.

11. Acceleration-responsive apparatus comprising a support, a mass movable in relation to said support along a sensing axis responsive to acceleration, a pair of spring-washer members of normally substantially frusto-conical configuration mounted on said support and having inner and outer peripheral portions deflectable in relation to one another along said axis between two positions of stable equilibrium in which said inner portion of each of said members is disposed on opposite sides of said outer portion thereof, said spring-washer members being dimensioned to develop thrust forces between said inner and outer portions along said axis in one and the opposite direction toward said equilibrium orientations upon relative deflection of said portions through an unstable cross-over position in which said members are substantially flat, means mounting one of said inner and outer portions of said spring-washer members in substantially fixed spaced relationship along said axis, said mass being mounted on said spring-washer members in substantiallly fixed relationship with the other of said portions of said members to deflect said other portions of said members and to flatten said member responsive to acceleration along said axis, adjustable stop means mounted on said support and adjusted to limit axial deflection of said mass to a biased position at which said spring-washer members are each disposed intermediate a stable equilibrium position and an unstable cross-over position, whereby a predetermined acceleration force acting on said mass in one direction along said axis acts to deflect said spring-washer members through said unstable cross-over positions, and electric circuit means characterizing axial movement of said mass in response to occurrence of said predetermined acceleration.

12. Acceleration-responsive apparatus comprising a support, a mass movable in relation to said support along a sensing axis responsive to acceleration, at least one spring-washer member of a normally substantially frusto-conical configuration mounted on said support and having inner and outer peripheral portions deflectable in relation to one another along said axis between two positions of stable equilibrium in which said inner portion is disposed on opposite sides of said outer portion, said spring-washer member having a normal height of said frusto-conical configuration which is at least in a ratio to the substantially uniform thickness thereof which produces a tendency for said portions to assume said equilibrium positions, said support being proportioned to mount said outer portion of said spring-washer member in a substantially fixed relationship along said axis between surfaces spaced by a distance greater than said thickness and disposed perpendicular to said axis, said mass being positioned on said support to deflect said inner portion of said member and to flatten said member responsive to acceleration of said axis, adjustable stop means mounted on said support and adjusted to limit axial deflection of said inner portion of said member to a biased position intermediate one of said stable equilibrium positions and an unstable position in which said member is flattened, whereby a predetermined acceleration force acting on said mass in one direction along said axis deflects said inner portion from said biased position through said unstable position, and electric circuit means characterizing axial movement of said inner portion of said member in response to occurrence of said predetermined acceleration.

13. Acceleration-responsive apparatus as set forth in claim 12 wherein said mass is distributed on both sides of said spring-washer member and is proportioned to have surfaces thereof engage sides of said spring-washer member about said inner peripheral portion of said member.

14. Acceleration-responsive apparatus comprising a casing having a bore therein along an axis and having a recess communicating with said bore and extending radially outward from said bore and axis, a mass disposed within said bore for movement in relation to said casing along said axis and having a recess extending radially inward from the exterior thereof, at least one annular spring-washer member of a normally frustro-conical configuration, said spring-washer member having a normal height of said frusto-conical configuration which is at least in a ratio to the substantially uniform thickness thereof which produces a tendency for the inner periphery thereof to assume either of two stable equilibrium positions on opposite sides of the outer periphery thereof, said outer periphery of said spring-washer member being disposed within said casing recess and said inner periphery being disposed within said mass recess, adjustable stop means mounted on said casing and adjusted along said axis to frictionally engage said mass and force said mass against said inner periphery of said spring-washer member to a biased position at which said inner preiphery is disposed intermediate one of said stable equilibrium positions and an unstable position in which said spring-washer member is substantially flattened, whereby frictional engagement of said stop means and mass suppresses tendencies of said mass to vibrate and whereby a predetermined acceleration force acting on said mass in one direction along said axis acts to deflect said inner periphery of said spring-washer member through said unstable position, and electric circuit means characterizing axial movement of said mass in response to occurrence of said predetermined acceleration force.

15. Acceleration-responsive apparatus comprising a casing having a substantially cylindrical bore therein and having an annular recess communicating with said bore and extending radially outward from said bore and the longitudinal axis thereof, a substantially cylindrical mass assembly fitted within said bore for sliding movement in relation to said casing along said axis and having an annular recess extending radially inward from the exterior thereof, an annular spring-washer member of a normally frusto-conical configuration, said spring-washer member having a normal height of said frusto-conical configuration which is at least in the ratio of 2.83 to the substantially uniform thickness thereof which produces a tendency for the inner periphery thereof to assume either of two stable equilibrium positions on opposite sides of the outer periphery thereof, said outer periphery being disposed within said casing recess and said inner periphery being disposed within said mass assembly recess, said recesses each being dimensioned to accommodate movement of said inner periphery in relation to said outer periphery without restraint thereof, first and second adjustable stops axially adjusted along said axis to engage said mass assembly at opposite axial ends thereof and to limit axial movement of said mass to first and second biased positions at which said inner periphery is disposed intermediate a different one of said stable equilibrium positions and an unstable position in which said spring-washer member is substantially flattened, whereby frictional engagement of one of said stops and said mass assembly at any time suppresses tendencies of said mass assembly to vibrate and whereby predetermined acceleration forces acting on said mass assembly in different directions along said axis act to deflect said inner periphery of said member through said unstable position, each of said stops having an electrically conductive contacting surface, an electrical contact carried by said mass assembly and having contacting surfaces disposed for engagement with said contact surfaces of said stops, flexible electrical conductor means mounted on said casing and electrically coupled with said contact of said mass assembly, and means insulating said contacting surfaces of said stops from one another and from said contact.

References Cited in the file of this patent

UNITED STATES PATENTS

| | | |
|---|---|---|
| 1,845,848 | Richards | Feb. 16, 1932 |
| 2,671,832 | Hansard et al. | Mar. 9, 1954 |
| 2,787,678 | Burggren | Apr. 2, 1957 |